United States Patent
Hossain

(10) Patent No.: US 10,442,971 B2
(45) Date of Patent: *Oct. 15, 2019

(54) HYDRO-FRACKING METHOD USING AN ALOE VERA FRACTURING FLUID

(71) Applicant: King Fahd University of Petroleum and Minerals, Dhahran (SA)

(72) Inventor: Mohammed Enamul Hossain, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 145 days.

This patent is subject to a terminal disclaimer.

(21) Appl. No.: 15/882,245

(22) Filed: Jan. 29, 2018

(65) Prior Publication Data

US 2018/0155600 A1  Jun. 7, 2018

Related U.S. Application Data

(63) Continuation of application No. 15/041,577, filed on Feb. 11, 2016, now Pat. No. 9,879,171.

(51) Int. Cl.

| | |
|---|---|
| *E21B 43/26* | (2006.01) |
| *C09K 8/68* | (2006.01) |
| *C09K 8/62* | (2006.01) |
| *C09K 8/04* | (2006.01) |
| *C09K 8/05* | (2006.01) |
| *E21B 21/00* | (2006.01) |
| *C09K 8/20* | (2006.01) |
| *C09K 8/66* | (2006.01) |
| *C09K 8/70* | (2006.01) |
| *C09K 8/84* | (2006.01) |
| *C09K 8/86* | (2006.01) |
| *C09K 8/92* | (2006.01) |

(52) U.S. Cl.
CPC ............. *C09K 8/04* (2013.01); *C09K 8/05* (2013.01); *C09K 8/20* (2013.01); *C09K 8/665* (2013.01); *C09K 8/68* (2013.01); *C09K 8/70* (2013.01); *C09K 8/845* (2013.01); *C09K 8/86* (2013.01); *C09K 8/92* (2013.01); *E21B 21/003* (2013.01); *E21B 43/26* (2013.01); *C09K 2208/34* (2013.01)

(58) Field of Classification Search
CPC .. E21B 43/26; C09K 8/68; C09K 8/62; C09K 8/04

See application file for complete search history.

(56) References Cited

U.S. PATENT DOCUMENTS

| | | |
|---|---|---|
| 3,208,524 A | 9/1965 | Horner |
| 4,500,436 A | 2/1985 | Pabley |
| 6,271,001 B1 | 8/2001 | Clarke |
| 9,879,171 B2 * | 1/2018 | Hossain ............ C09K 8/04 |
| 2012/0157354 A1 | 6/2012 | Li |

FOREIGN PATENT DOCUMENTS

WO   WO 2014/165249 A1   10/2014

OTHER PUBLICATIONS

K.Bachhav "Aloe Vera—Upcoming Ingredient in Drilling Mud" http://world-petroleum-techtrends.blogspot.in/2012/04/aloe-vera-upcoming-ingredient-in.html, Apr. 5, 2012. pp. 1-1.

V.Mahto, "Rheological study of a water based oil wet drilling fluid", Journal of Petroleum Science and Engineering, vol. 45, Issues 1-2. Nov. 30, 2014, pp. 1-1.

https://www.ncbi.nlm.nih.gov/pmc/articles/PMC2763764/?report=printable downloaded on Aug. 29, 2017.

Pawar (Quantitative Assessment of Mineral Composition of *Aloe vera* (L.) Burm.f. leaves by ICP-MS and CHNS Analyzer, International Journal of Science and Research (IJSR), 2015, 1372-1376.

* cited by examiner

*Primary Examiner* — Catherine Loikith
(74) *Attorney, Agent, or Firm* — Oblon, McClelland, Maier & Neustadt, L.L.P.

(57) ABSTRACT

A drilling mud composition including Aloe vera particles with a largest dimension of 75-600 μm, an aqueous base fluid, and a viscosifier, where the Aloe vera particles are present in the drilling mud composition at a concentration of less than 150 ppm, relative to the total weight of the drilling mud composition. A process for fracking a geological formation, whereby the drilling mud composition is injected into the geological formation through a well bore at a pressure of at least 5,000 psi to fracture the geological formation.

10 Claims, No Drawings

HYDRO-FRACKING METHOD USING AN ALOE VERA FRACTURING FLUID

CROSS-REFERENCE TO RELATED APPLICATIONS

The present application is a Continuation of Ser. No. 15/041,577, having a filing date of Feb. 11, 2016.

BACKGROUND OF THE INVENTION

Technical Field

The present invention relates to a drilling mud composition that contains Aloe vera particles as a rheological modifier and/or a filtration control agent, and a process for fracking a geological formation using the drilling mud composition.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids or muds are used in the rotary drilling process of wells to tap underground collections of oil and gas. These muds have several functions. The most important functions are to assist in the removal of cuttings from the well, to seal off unwanted formations which may be encountered at different levels preventing the loss of drilling fluids to void spaces and to permeable or porous formations, to lubricate the drilling tool, to maintain the well bore pressure and stability of the bore hole, and to hold the cuttings in the suspension during events of shutdowns in drilling.

Drilling mud additives form a thin, low permeability filter cake (mud cake) over time that seals openings in formations to reduce the unwanted influx of fluids into permeable formations. A mud cake forms when the drilling fluid contains particles that are approximately the same size as or have diameters greater than about one third of the pore diameter (or the width of any opening such as induced fractures) in the formation being drilled. The drilling fluid must circulate in the wellbore (down the drill pipe and back up the annulus) to perform the above mentioned functions for the drilling process to continue smoothly. Therefore, it is essential for the drilling fluid to remain in the wellbore all the time in order to control and prevent caving of the wellbore.

Fluid loss is a common occurrence in drilling operations. As stated, drilling fluids are designed to seal porous formations intentionally while drilling, by the creation of a mud cake. However, some fluid will be lost through the mud cake and thus fluid loss control additives are required. In some situations when the borehole penetrates a fracture in the formation through which most of the drilling fluid may be lost, the rate of loss may exceed the rate of replacement. Drilling operations may have to be stopped until this zone is sealed and fluid loss to the fracture is reduced to an acceptable level. This phenomenon of losing the drilling fluid to the formation is referred to as lost circulation. Materials added to the drilling mud to stop the loss are referred to as lost circulation recovery materials or additives or simply lost circulation materials.

Loss of mud to the formation is an extremely undesirable phenomenon as it (1) leads to poor circulation and therefore less efficient removal of cuttings, (2) requires additional cost in rig time, manpower and material to replenish the lost mud and restore circulation and in extreme cases, (3) leads to insufficient downhole hydrostatic pressure which may lead to a blowout. Curing losses effectively and quickly is still a matter of concern for many companies and operators. Over the years, numerous techniques have been developed in order to cure or to reduce low to moderate loss of mud to the well bore. Under these conditions, the normal procedure is to add fluid loss agents which alone may decrease the losses while drilling to an acceptable level.

It is advantageous to maintain a lost circulation material continuously in the drilling fluid to stop the lost circulation as soon as it occurs rather than after mud flow has enlarged flow channels. The most common method in use today for the control of lost fluid circulation is the use of sealing or plugging agents in the drilling mud for bridging the pores or fissures of the sub-surface formation.

A lot of research has been conducted and documented in the literature covering natural elements used in drilling fluids. Morris G. (U.S. Pat. No. 3,042,607A—incorporated herein by reference in its entirety) disclosed the use of peach seeds as a filtration control agent using a mixture containing peach seeds with a particle size ranging from approximately a 4 mesh to 200 mesh. This size grading of the peach seeds assured that all the particle sizes necessary for the efficient bridging of the porous subsurface formations would be present in the additive. The smaller seed particles continually filter into porous formations until an effective mud sheath is formed by the larger seed particles. Lummus et al. (U.S. Pat. No. 3,629,102A—incorporated herein by reference in its entirety) used ground nutshells and nut flour as fluid loss additives and found that nutshells with a 20 to 100 mesh size and nut flour with a 100 mesh size to be the preferred particle size to avoid loss of fluid into the formation. Green, P. (U.S. Pat. No. 4,474,665A—incorporated herein by reference in its entirety) described the use of ground and sized cocoa bean shells as lost circulation material in a drilling fluid. The lost circulation controller (cocoa bean shells) had a particle size distribution ranging from 2 to 100 mesh size. Burts, B. (U.S. Pat. Nos. 5,118, 664A; 5,332,724A—each incorporated herein by reference in its entirety) disclosed the use of a rice fraction and corn cob outers as lost circulation materials in drilling fluids. Creamens et al. (U.S. Pat. No. 6,630,429B1—incorporated herein by reference in its entirety) described the use of pelletized cotton seed hulls, corn starch, pelletized wood and other vegetable starch as environmentally safe lost circulation materials. Sampey, J. (U.S. Pat. No. 7,094,737B1—incorporated herein by reference in its entirety) disclosed sugar cane ash as a filtration control additive for drilling fluid applications. Ghassemzadeh, J. (U.S. Pat. No. 7,923, 413B2—incorporated herein by reference in its entirety) disclosed the use of polyvinyl alcohol fibers as lost circulation materials in drilling fluids, with an average fine particle size of 5 to 15 microns, medium particles of an average size of about 20 to 150 microns and coarse particles having an average size of about 300 microns to 2500 microns.

In view of the forgoing, the objective of the present invention is to provide a drilling mud composition that contains Aloe vera particles as a rheological modifier and/or a filtration control agent, and to provide a process for fracking a geological formation using the drilling mud composition.

BRIEF SUMMARY OF THE INVENTION

According to a first aspect the present disclosure relates to a drilling mud composition including i) Aloe vera particles, which have a largest dimension of 75-600 μm ii) an aqueous base fluid and iii) a viscosifier, wherein the Aloe vera particles are present in the drilling mud composition at a concentration of less than 150 ppm, relative to the total weight of the drilling mud composition.

In one embodiment, the viscosifier is bentonite.

In one embodiment, the bentonite is present in 0.1-30 wt % relative to the total weight of the drilling mud composition.

In one embodiment, the drilling mud composition has an apparent viscosity of 11-15 cP.

In one embodiment, the drilling mud composition has a plastic viscosity of 7.5-10.5 cP.

In one embodiment, the drilling mud composition has a yield point of 5-12 lb/100 ft$^2$.

In one embodiment, the drilling mud composition has a gel strength of 3-15 lb/100 ft$^2$ after 10 seconds.

In one embodiment, the Aloe vera particles comprise 20-60 wt % carbon, 30-36 wt % oxygen, 2-14 wt % calcium, 1-9 wt % potassium, 1-8 wt % chlorine, 1-5 wt % aluminum, and 1-4 wt % phosphorous, relative to the total weight of the Aloe vera particles.

In one embodiment, the Aloe vera particles comprise vitamin A, vitamin B1, vitamin B2, vitamin B6, vitamin B12, vitamin C, vitamin E, folic acid, niacin, or combinations thereof.

In one embodiment, the Aloe vera particles are present in the drilling mud composition at a concentration ranging from 0.1-100 ppb, relative to the total weight of the drilling mud composition.

In one embodiment, the drilling mud composition reduces a % loss of the aqueous base fluid during filtration by 20-50% compared to a drilling mud composition that is substantially the same without the Aloe vera particles.

In one embodiment, the drilling mud composition further comprises at least one additive selected from the group consisting of an antiscalant, a thickener, a deflocculant, an anionic polyelectrolyte, a lubricant, a fluid loss additive, and a weighting agent.

According to a second aspect, the present disclosure relates to a process for fracturing an underground geological formation involving i) mixing water and bentonite to form a first drilling mud composition ii) mixing the drilling mud with Aloe vera powder to form a second drilling mud composition iii) injecting the second drilling mud composition into the underground geological formation through a well bore at a pressure of at least 5,000 psi to fracture the underground geological formation and form fissures in the underground geological formation and iv) injecting a suspension of sand or quartz into the underground geological formation through a well bore to deposit the sand or the quartz in the fissures.

In one embodiment, the second drilling mud composition reduces a % loss of the aqueous base fluid in the underground geological formation during the injecting compared to a third drilling mud composition that is substantially the same without the Aloe vera particles.

In one embodiment, the method further comprises circulating the second drilling mud composition within the well bore after the injecting.

In one embodiment, the second drilling mud composition is circulated for at least 30 minutes.

In one embodiment, the second drilling mud composition further comprises at least one additive selected from the group consisting of an antiscalant, a thickener, a deflocculant, an anionic polyelectrolyte, a lubricant, a fluid loss additive, and a weighting agent.

The foregoing paragraphs have been provided by way of general introduction, and are not intended to limit the scope of the following claims. The described embodiments, together with further advantages, will be best understood by reference to the following detailed description.

DETAILED DESCRIPTION OF THE EMBODIMENTS

According to a first aspect the present disclosure relates to a drilling mud composition including Aloe vera particles, which have a largest dimension of 25-700 m, preferably 35-680 μm, preferably 45-660 μm, preferably 55-640 μm, preferably 65-620 μm, preferably 75-600 μm.

Aloe vera (e.g., Aloe barbadensis Miller) is a stemless or very short-stemmed succulent plant growing to 60-100 cm (24-39 in) tall, spreading by offsets. The leaves are thick and fleshy, green to grey-green, with some varieties showing white flecks on their upper and lower stem surfaces. The margin of the leaf is serrated and has small white teeth. The leaves are typically harvested when the plant is fully mature. A fully matured plant, preferably four to five years in age, has broader leaves than that of a plant that has not yet reached maturity. Accordingly, the leaves of a fully matured Aloe vera plant contain a larger amount of Aloe vera than immature plants. Aloe vera has been used for medicinal purposes in several cultures for millennia: Greece, Egypt, India, Mexico, Japan and China etc. as it is considered to be a miracle plant. Aloe vera has as many as 75 nutrients, 20 minerals, 12 vitamins, 18 amino acids and 200 active enzymes and contains for example, Vitamin A, B1, B2, B6 and B12, Vitamin C and E, folic acid and Niacin. Aloe vera is commonly used to 1) Aid Digestion and treats intestinal issues, 2) Boost immune power, 3) treat inflammation, wounds and burns, 4) treat respiratory disorders and diabetes among other medicinal applications.

Based on its gelation properties, Aloe vera may be used in drilling fluids. Aloe vera contains water holding tissue which can prove as water trapper to lower its saturation in a reservoir. Aloe vera also contains acids and protein content, which can be used to aid mud cake removal or stuck pipe removal. Further, the amino acids present could aid the removal of scale deposits known to form in drilling applications.

In the present disclosure, the Aloe vera particles may be harvested from the plant in a number of ways. Aloe vera leaves may be processed as soon as possible after cutting from the plant. Immediate processing of the Aloe vera leaves prevents and/or minimizes degradative decomposition of the Aloe vera composition, which begins upon cutting due to natural enzymatic reactions as well as growth of bacteria due to the presence of oxygen. After cutting, the Aloe vera leaves may be washed in water or a water and detergent mixture. The leaves may also be washed with a suitable bacteriocide and fungicide. For example, the leaves can be soaked in a water and chlorine solution for about 5 to 10 minutes, rinsed with sterilized water, and dried to limit any lint on the leaves. The Aloe vera is separated from the leaf by first slicing and grinding the leaves. Any grinder or grinder machine known in the Aloe vera art can be used. After grinding the Aloe vera into particles, the Aloe vera particles may be filtered using sieves. In one embodiment, the Aloe vera particles are filtered using a series of sieves with decreasing sieve size openings until a desired particle size is obtained. In addition to sieves, other filtration devices may be used, including cartridge filters, ionic filters, size exclusion filters and the like that are capable of producing Aloe vera particles with a preferred particle size. The Aloe vera powder is preferably obtained by removing the skins of the leaves to form Aloe vera filets (e.g., Aloe vera gel). The filets may be dried using conventional techniques such as thermal evaporation and spray drying. The spray dried materials derived from the skinless Aloe vera gel are subsequently ground to form dry Aloe vera particles having a low cellulose content but high in Aloe polysaccharides and Acemannan with an unadjusted pH of 3.4-5.4. The moisture content of the Aloe vera particles is less than 10% based on the total weight of the powder, preferably less than 8%, 6%, 4% or 2%.

In one embodiment, the Aloe vera particles comprise 20-60 wt % carbon, 30-36 wt % oxygen, 2-14 wt % calcium, 1-9 wt % potassium, 1-8 wt % chlorine, 1-5 wt % aluminum, and 1-4 wt % phosphorous, relative to the total weight of the Aloe vera particles. In a preferable embodiment, the Aloe vera particles comprise 40-60 wt % carbon, 33-36 wt % oxygen, 2-14 wt % calcium, 1.5-9 wt % potassium, 1-8 wt % chlorine, 3-5 wt % aluminum, and 2-3 wt % phosphorous, relative to the total weight of the Aloe vera particles. However, other Aloe vera compositions may be used, depending on the source of the Aloe vera plant, and on the technique used to harvest the Aloe vera plant, and the drilling mud composition will still function as intended.

In one embodiment, the Aloe vera particles comprise vitamin A, vitamin B1, vitamin B2, vitamin B6, vitamin B12, vitamin C, vitamin E, folic acid, niacin, or combinations thereof. Various other compounds may also be present in the Aloe vera particles depending on the source of the Aloe vera and on the technique used to harvest the Aloe vera plant, including aloin, which can be found in the exudate at levels from 0.1 to 6.6% of leaf dry weight, a plurality of nutrients, minerals, vitamins, amino acids, active enzymes, and phytochemicals including but not limited to acetylated mannans, polymannans, anthraquinone C-glycosides, anthrones, other anthraquinones, such as emodin, and various lectins.

In addition to Aloe vera particles containing natural Aloe vera, processed, partially processed, and/or treated Aloe vera may also be used in the present disclosure. In one embodiment, the Aloe vera particles may be hydrogenated or partially hydrogenated, wherein at least a portion of unsaturated compounds present in the natural Aloe vera are saturated or partially saturated. In one embodiment, the Aloe vera particles may be chemically treated, for example by hydrolyzing or partially hydrolyzing natural Aloe vera, wherein a total ester content of the natural Aloe vera is at least partially converted into carboxylates and alcohols. In one embodiment, the Aloe vera particles may be acid treated, whereby at least a portion of natural Aloe vera is degraded. In one embodiment, the Aloe vera particles may be treated with a stabilizing agent, such as a tocotrienol/tocopherol blend, rosmarinic acid, and/or polyphenols, to impart stability. Exemplary stabilizing agents include alpha tocotrienol, beta tocotrienol, gamma tocotrienol, delta tocotrienol, alpha-tocopherol, beta-tocopherol, gamma-tocopherol, or delta-tocopherol, rosmarinic acid, procyanidin, proanthocyanidin, cinnamic acid, caftaric acid (3-deoxycafaric acid), phenolic acid, gallic acid, and the like. In one embodiment, the Aloe vera particles may contain 0.01% to about 2% of the stabilizing agent, preferably 0.01% to about 1.6%, preferably 0.01% to about 1.4%, preferably 0.01% to about 1.2%, preferably 0.01% to about 1.0%, preferably 0.01% to about 0.8%, preferably 0.01% to about 0.6%, preferably 0.01% to about 0.4%.

Further, the Aloe vera particles may be cleaned after harvesting from natural sources to the extent necessary to remove bacteria, fungi and other organisms. The cleaning may be accomplished by using a combination of methods to assure that all bacteria/organisms are removed. This can include the use of chemical compounds such as glucose oxidase, boiling, ultraviolet light and the use of bacteria removing filters. The removal of bacteria, fungi, and other organisms may slow and/or prevent the degradation of the Aloe vera particles in the drilling mud composition caused by bacteria, and therefore the drilling mud composition may have a longer duration (and may therefore be cycled during a drilling operation for longer periods of time). In some embodiments, the Aloe vera particles may also include preservatives, e.g., sodium benzoate may be added in sufficient quantities (e.g. 0.01% to 0.1% by weight of sodium benzoate relative to the total weight of the Aloe vera particles). Another example of a preservative that may be added to the Aloe vera particles is glucose oxidase/catalase (e.g. 0.01% to 0.1% by weight of glucose oxidase/catalase relative to the total weight of the Aloe vera particles). In one embodiment, the preservatives are incorporated into an Aloe vera extract (through mixing, blending, stirring etc.) prior to the formation of Aloe vera particles, whereby the preservative is dispersed uniformly throughout the Aloe vera particles. In an alternative embodiment, the preservatives are added as a coating (e.g. through spraying a solution of the preservatives onto the Aloe vera particles, dipping/immersing the Aloe vera particles into a solution of the preservatives, etc.), whereby the preservative is present on the surface of the Aloe vera particles to prevent premature degradation. In one embodiment, the Aloe vera particles are coated with the preservative such that at least 50%, at least 60%, at least 70%, at least 80%, at least 90%, at least 95% of the Aloe vera surface is covered by the preservative.

In one embodiment, the Aloe vera particles are present in the drilling mud composition at a concentration of less than 150 ppm, less than 100 ppm, less than 50 ppm, less than 40 ppm, less than 30 ppm, less than 20 ppm, less than 10 ppm, less than 5 ppm, less than 1 ppm, less than 0.1 ppm, for example, ranging from 0.1-100 ppb, preferably 0.5-90 ppb, preferably 0.5-80 ppb, preferably 0.5-70 ppb, preferably 0.5-60 ppb, preferably 0.5-50 ppb, preferably 0.5-40 ppb, preferably 0.5-30 ppb, preferably 0.5-20 ppb, preferably 0.5-15 ppb, preferably 0.5-10 ppb, relative to the total weight of the drilling mud composition. In a preferred embodiment, the Aloe vera particles are present in the drilling mud composition at a concentration ranging from 1-10 ppb, relative to the total weight of the drilling mud composition.

The drilling mud composition also includes an aqueous base fluid. The aqueous base fluid may refer to any water containing solution, including saltwater, hard water, and fresh water. For purposes of this description, the term "saltwater" will include saltwater with a chloride ion content of between about 6000 ppm and saturation, and is intended to encompass seawater and other types of saltwater including groundwater containing additional impurities typically found therein. The term "hard water" will include water having mineral concentrations between about 2000 mg/L and about 300,000 mg/L. The term "fresh water" includes water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. Drilling muds are ordinarily classified as saltwater muds when they contain over 1% salt (about 6000 ppm of chloride ion).

In one embodiment, the aqueous base fluid is present in at least 70 wt % relative to the total weight of the drilling mud composition, preferably at least 75%, preferably at least 80%, preferably at least 85%, preferably at least 90%.

The drilling mud composition also includes a viscosifier. Exemplary viscosifiers include, but are not limited to bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite and the like.

In one embodiment, the viscosifier is bentonite. Bentonite is an absorbent aluminum phyllosilicate, impure clay consisting primarily of montmorillonite. Montmorillonite generally comprises sodium, calcium, aluminum, magnesium, and silicon, and oxides and hydrates thereof. Other compounds may also be present in the bentonite of the present disclosure, including, but not limited to, potassium-containing compounds, and iron-containing compounds. There are different types of bentonite, named for the respective dominant element, such as potassium (K), sodium (Na), calcium (Ca) and aluminum (Al). Therefore, in terms of the present disclosure "bentonite" may refer to potassium bentonite, sodium bentonite, calcium bentonite, aluminum bentonite, and mixtures thereof depending on the relative amounts of potassium, sodium, calcium, and aluminum in the bentonite.

In one embodiment, the bentonite is present in 0.1-30 wt % relative to the total weight of the drilling mud composition, preferably 0.1-25 wt %, preferably 0.1-20 wt %, preferably 0.1-15 wt %, preferably 0.1-10 wt %.

After adding the Aloe vera particles, the aqueous base fluid, and the bentonite, thorough mixing is desirable to avoid creating lumps or "fish eyes." To avoid lumps or "fish eyes" the drilling mud composition may be stirred with a stirring speed of 1-800 rpm, or 2-700 rpm, or 3-600 rpm. In one embodiment, the various ingredients of the drilling mud composition (the Aloe vera particles, the aqueous base fluid, and the viscosifier) are mixed for a sufficient period of time to allow for hydration of the bentonite clay in the aqueous base fluid, and this period of time is usually between about 5 and about 60 minutes, preferably between about 10 and about 40 minutes, preferably between about 20 and about 30 minutes. Other mixing times may be also utilized to make the drilling mud composition (e.g. less than 5 minutes, or more than 60 minutes) so long as the drilling mud composition is substantially free of lumps.

In one embodiment, the pH of the drilling mud composition may be adjusted depending on the drilling application or problems that may be encountered during a drilling operation. For example, the pH of the drilling mud composition may be adjusted so as to provide for optimal solubility of the various organic components in the dispersion (e.g. organic components from the Aloe vera particles, the preservative, the stabilizing agent, the antiscalant, the thickener, etc.) and is preferably between about 8 and 12, preferably 9 and 11. This pH range may also be advantageously suited for drilling operations where acid promoted damage/corrosion to equipment, such as metal equipment is a concern. In one embodiment, the pH of the drilling mud composition is between about 1 and 8, preferably 2 and 7, more preferably 3 and 6. This pH range may be advantageously suited for drilling applications where scale formation is particularly problematic for example. Various acids (e.g. citric acid, phosphoric acid, hydrochloric acid, etc.), bases (e.g. hydroxide bases, carbonate bases, amine bases, etc.), and buffers (e.g. monosodium phosphate, disodium phosphate, sodium tripolyphosphate, etc.) may be used to buffer or to adjust the pH of the drilling mud composition, and such acids, bases, and buffers are known to those of ordinary skill in the art.

Current American Petroleum Institute (API) specifications for drilling mud compositions that include bentonite require the use of 22.5 gm bentonite per 350 mL fresh water (6.42 wt % of bentonite). After mixing the drilling mud compositions for 20 minutes, overnight aging, and stirring for an additional five minutes, API standards call for a 600 rpm dial reading, using a Fann 6-speed V-G meter, model 35A, of 30 minimum. The Fann meter is used to determine standard drilling mud parameters as follows:

$$\text{Apparent viscosity } (AV, \text{cp}) = \frac{600 \text{ rpm reading}}{2}$$

Plastic viscosity (PV, cp)=600 rpm–300 rpm reading

Yield point (YP, lb/100 ft$^2$)=300 rpm reading–plastic viscosity

Gel Strength (GS, lb/100 ft$^2$) is measured by taking a 3 rpm reading, allowing the drilling mud composition to set for 10 seconds or for 10 minutes, and taking a second 3 rpm reading. A difference in these readings between about 1 and 8 is preferred.

It should be recognized that the above parameters are interrelated, and once an acceptable apparent viscosity has been obtained, the other values may be adjusted by adjusting the proportions of the Aloe vera, the viscosifier, and other additives.

In one embodiment, the drilling mud composition has an apparent viscosity of 10-25 cP, preferably 10-20 cP, preferably 11-15 cP.

In one embodiment, the drilling mud composition has a plastic viscosity of 5-20 cP, preferably 6-15 cP, preferably 7-12 cP, preferably 7.5-10.5 cP.

In one embodiment, the drilling mud composition has a yield point of 4-15 lb/100 ft$^2$, preferably 5-12 lb/100 ft$^2$, preferably 6-9 lb/100 ft$^2$, preferably 6.5-8.5 lb/100 ft$^2$.

In one embodiment, the drilling mud composition has a gel strength of 3-15 lb/100 ft$^2$, preferably 4-13 lb/100 ft$^2$, preferably 5-12 lb/100 ft$^2$, preferably 6-8 lb/100 ft$^2$ after 10 seconds.

In one embodiment, the drilling mud composition reduces a % loss of the aqueous base fluid during filtration by 20-50%, preferably 25-40%, preferably 28-30% compared to a drilling mud composition that is substantially the same without the Aloe vera particles.

In one embodiment, the drilling mud composition further comprises at least one additive selected from the group consisting of an antiscalant, a thickener, a deflocculant, an anionic polyelectrolyte, a lubricant, a fluid loss additive, and a weighting agent. In one embodiment, the total weight of the at least one additive present in the drilling mud composition is up to 10 wt %, preferably up to 9 wt %, preferably up to 8 wt %, preferably up to 7 wt %, preferably up to 6 wt %, preferably up to 5 wt %, preferably up to 4 wt %, preferably up to 3 wt %, preferably up to 2 wt %, preferably up to 1 wt %, preferably up to 0.5 wt %, preferably up to 0.1 wt %, preferably up to 0.01 wt %, relative to the total weight of the drilling mud composition.

In one embodiment, an antiscalant is incorporated as a part of the drilling mud composition. The term "antiscalant" refers to any chemical agent that prevents, slows, minimizes, or stops the precipitation of scale (e.g. calcium carbonate, calcium sulfate, barium sulfate, strontium sulfate, calcium phosphate, calcium fluoride, calcium silicate, magnesium hydroxide, zinc carbonate, and the like) from the aqueous salt solution. Antiscalants which may be used in the present disclosure include, phosphine or sodium hexametaphosphate, sodium tripolyphosphate and other inorganic polyphosphates, hydroxy ethylidene diphosphonic acid, butanetricarboxylic acid, phosphonates, or phosphonic acids such as amino tris (methylenephosphonic acid) (ATMP), etc. carboxyl group-containing starting material acids, maleic acid, acrylic acid and itaconic acid and the like, polycarboxylic acid polymers, sulfonated polymers, vinyl sulfonic acid, allyl sulfonic acid, and 3-allyloxy-2-hydroxy-propionic acid and other vinyl monomers having a sulfonic acid group, or a non-ionic acrylamide monomer from the vinyl copolymer, and the like. Further, organic acids which are safe under the FDA GRAS guidelines for food production yet still effective in decomposition of carbonates found in the soils and in rock formations may be used. The basic principle action of organic acids on carbonates is to cause the disassociation or the carbonate to produce the oxide and carbon dioxide. The first group of suitable organic acids is lactic, acetic, formic, fumaric, citric, oxalic, adipic and uric. The second group of suitable organic acids is the carboxylic acids, whose acidity is associated with their carboxyl group —COOH. Sulfonic acids, containing the group —$SO_2OH$, are relatively stronger acids. The relative stability of the conjugate base of the acid determines its acidity. In some biological systems more complex organic acids such as L-lactic, citric, and D-glucuronic acids are formed. These use the hydroxyl or carboxyl group. The third group of suitable organic acids is humic, sebacic, stearic, gallic, palmitic, caffeic, glyoxylic, fulvic, carnosic, anthranilic, ellagic, lipoic, chlorogenic, rosmarinic, phosphoric, methacrylic, oleanic, nitrohumic, florocinnamic, hexaflorosilicic, hydrofluoric, hydroxycitric and silicofluoric. The fourth group of suitable organic acids is fruit acids. The acids in fruits are chiefly acetic, malic, citric, tartaric, oxalic, and in some instances boric. Malic acid is present in apples, pears, currants, blackberries, raspberries, quince, pineapple, cherries, and rhubarb. Citric acid is found in lemons, oranges, grapefruit, lemons, limes, quince, gooseberry, strawberry, raspberry, currant, and cranberry. Tartaric acid occurs in grapes. Boric acid is found in many fresh fruits and vegetables. Mandelic acid is present in almonds. The fifth group of suitable organic acids is beta hydroxy acids which is a type of phenolic acid. Salicylic acid is a colorless crystalline organic acid whose main active ingredient obtained from this source is a monohydroxybenzoic acid.

In one embodiment, a thickener is present in the drilling mud composition. Various thickeners may be used to influence the viscosity of the fluid, and exemplary thickeners include xanthan gum, guar gum, glycol, carboxymethylcellulose, polyanionic cellulose (PAC), or starch, and mixtures thereof.

A deflocculant may also be incorporated into the drilling mud composition. A deflocculant is a chemical additive to prevent a colloid from coming out of suspension or to thin suspensions or slurries, and may be used to reduce viscosity of clay-based muds. One type of deflocculant is an anionic polyelectrolyte, such as acrylates, polyphosphates, lignosulfonates (Lig) or tannic acid derivates such as Quebracho.

In one embodiment, the drilling mud composition also includes a lubricant, such as an oil, for lubrication and fluid loss control. The lubricant may be a synthetic oil or a biolubricant, such as those derived from plants and animals for example vegetable oils. Synthetic oils include, but are not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC). Exemplary vegetable oil-based lubricants (i.e. biolubricants) that may be used in the present disclosure include canola oil, castor oil, palm oil, sunflower seed oil and rapeseed oil from vegetable sources, and Tall oil from tree sources, and the like.

Further, a fluid loss additive may be incorporated into the drilling mud composition to control loss of drilling fluids into permeable formations. In addition to Aloe vera particles, in one or more of their embodiments, additional fluid loss additives may be added to the composition including, but not limited to, starch, guar, carboxymethyl cellulose, polysaccharides, and acrylic polymers such as polyacrylamide. In one embodiment, the fluid loss additive is added in an amount necessary to achieve the desired fluid loss control, preferably less than 5 wt %, preferably less than 4 wt %, preferably less than 3 wt %, preferably less than 2 wt %, preferably less than 1 wt %, relative to the total weight of the drilling mud composition.

The drilling mud composition may also include a weighting agent. A weighting agent may be added to increase the overall density of the drilling fluid so that sufficient bottom hole pressure can be maintained thereby preventing an unwanted (and often dangerous) influx of formation fluids. Exemplary weighting agents include barium sulfate (barite), calcium carbonate (chalk) or hematite. Barite may be added to the prepared drilling mud composition without adversely affecting its stability or other properties.

According to a second aspect, the present disclosure relates to a process for fracking or fracturing a geological formation including mixing water and bentonite to form a first drilling mud composition, mixing the drilling mud with Aloe vera powder to form a second drilling mud composition, and injecting the second drilling mud composition into the underground geological formation through a well bore at a pressure of at least 5,000 psi, at least 5,500 psi, at least 6,000 psi, at least 6,500 psi, at least 7,000 psi, at least 7,500 psi to fracture the underground geological formation and form fissures in the underground geological formation.

"Fracking" or "fracturing" as used herein refers to the process of initiating and subsequently propagating a fracture of the rock layer by employing the pressure of a fluid as the source of energy. In some embodiments, fracking is accomplished by pumping in liquids at high pressure. A hydraulic fracture may be formed by pumping a fracturing fluid (i.e. the drilling mud composition, in one or more of its embodiments) into the wellbore at a rate sufficient to increase the pressure downhole to a value in excess of a critical fracture pressure associated with the formation rock. The pressure causes the formation to crack, allowing the fracturing fluid to enter and extend the crack farther into the formation. Following fracking by high pressures, the fractured formation allows more hydrocarbons (e.g., methane, condensate, ethane, oil) and/or water to be extracted since the formation walls are more porous. The fracking may be performed on new wells or wells with poor production. Fracking can be done in vertical wells, slanted wells, and in horizontally drilled wells. As used herein, a "well bore" includes any geological structure or formation, that may contain various combinations of natural gas (i.e., primarily methane), light hydrocarbon or non-hydrocarbon gases (including condensable and non-condensable gases), light hydrocarbon liquids, heavy hydrocarbon liquids, crude oil, rock, oil shale, bitumen, oil sands, tar, coal, and water. Exemplary non-condensable gases include hydrogen, carbon monoxide, carbon dioxide, methane, and other light hydrocarbons.

In one embodiment, the second drilling mud composition reduces a % loss of the aqueous base fluid in the underground geological formation during the injecting compared to a third drilling mud composition that is substantially the same without the Aloe vera particles.

In one embodiment, the method further comprises circulating the second drilling mud composition within the well bore after the injecting. In one embodiment, the second drilling mud composition is circulated for at least 30 minutes.

In one embodiment, the second drilling mud composition further comprises at least one additive selected from the group consisting of an antiscalant, a thickener, a deflocculant, an anionic polyelectrolyte, a lubricant, a fluid loss additive, and a weighting agent. Exemplary additives have been disclosed heretofore. In an alternative embodiment, the at least one additive may be injected into the geological formation as a separate component from the drilling mud composition. The additive may therefore be injected into the geological formation through a well bore at a pressure of at least 5,000 psi, at least 5,500 psi, at least 6,000 psi, at least 6,500 psi, at least 7,000 psi, at least 7,500 psi, in addition to the drilling mud composition, to fracture the geological formation, or may be injected into the geological formation through the well bore after the fracking.

The method may further include injecting a proppant into the well bore to maintain the structural integrity of the well bore. A "proppant" is used herein to refer to any granular material that, in an aqueous mixture, can be used to fracture the rock formation and to provide structural support to the well bore and/or fissures that develop in the rock formation due to pressurizing the rock formation during fracking. In one embodiment, the proppant is grains of sand, ceramic, silica, quartz, or other particulates that prevent the fractures from closing when the injection is stopped.

The examples below are intended to further illustrate protocols for preparing and characterizing the Aloe vera particles and the drilling mud composition, and are not intended to limit the scope of the claims.

Example 1

Aloe Vera Particle Characterization

Table 1 and 2 show the results of SEM-EDX and XRF analysis conducted on the Aloe vera sample. An analogy is found between the results of the two techniques as it is seen clearly that common elements such as Potassium, Calcium and Chlorine are found in high percentages from both compositional analysis practices.

TABLE 1

SEM-EDX analysis of Aloe vera

| Element | Atomic Number | Weight % |
| --- | --- | --- |
| Carbon (C) | 6 | 57.78 |
| Oxygen (O) | 8 | 35.81 |
| Calcium (Ca) | 20 | 2.09 |
| Potassium (K) | 19 | 1.62 |
| Chlorine (Cl) | 17 | 1.43 |
| Sodium (Na) | 11 | 0.87 |
| Magnesium (Mg) | 12 | 0.40 |

TABLE 2

XRF analysis of Aloe vera

| Element | Atomic Number | Weight % |
| --- | --- | --- |
| Silicon | 14 | 23.08 |
| Calcium | 20 | 13.7 |
| Potassium | 19 | 8.54 |
| Chlorine | 17 | 7.85 |
| Aluminum | 11 | 4.11 |
| Phosphorous | 15 | 2.33 |
| Sulfur | 16 | 1.29 |
| Titanium | 22 | 0.21 |

Example 2

Aloe Vera Particle Synthesis

Aloe vera stems were ground using a grinding machine. The powdered material was then passed through a series of U.S. Standard Series sieves of the fine series having a particle size range in the proportions shown in Table 3.

TABLE 3

Particle Size Distribution of Aloe vera

| Mesh Number | Sieve Size Opening (μ) | Percent Weight Retained (%) |
| --- | --- | --- |
| 30 | 600 | 29.75 |
| 50 | 300 | 23.00 |
| 100 | 150 | 10.50 |
| 120 | 125 | 3.00 |
| 170 | 90 | 4.00 |
| 200 | 75 | 6.50 |
| Passed 200 | <75 | 23.25 |

Example 3

Drilling Mud Preparation and Properties

A base mud was prepared using a commercially available viscosifier, bentonite. Bentonite was added to water under high speed stirring and different weights of powdered Aloe vera are added to this mixture. The rheological properties, density, viscosity and filtration loss of this newly developed drilling mud is then studied.

TABLE 4

Rheological parameters of Aloe vera muds

| Speed, rpm | Dial Reading, 0 ppb (only Bentonite) | 1.0 ppb | 2.0 ppb | 3.0 ppb | 4.0 ppb |
|---|---|---|---|---|---|
| 600 | 20 | 22 | 26 | 29 | 30 |
| 300 | 12 | 15 | 18 | 20 | 21 |
| 200 | 9 | 13 | 15 | 16 | 17 |
| 100 | 4 | 8 | 10 | 12 | 13 |
| 6 | 1.5 | 3 | 5 | 6 | 6 |
| 3 | 1 | 3 | 4 | 5 | 6 |
| AV, cp | 10 | 11 | 13 | 14.5 | 15 |
| PV, cp | 8 | 7.5 | 9 | 10 | 10.5 |
| VP, lb/100 ft$^2$ | 4 | 6.5 | 7.5 | 8 | 8.5 |
| GS 10 sec, lb/100 ft$^2$ | 1 | 6 | 7 | 7 | 8 |
| GS 10 min, lb/100 ft$^2$ | 10 | 10 | 10 | 10 | 10 |

This series of experiments is conducted on Aloe vera having a particle size range shown in Table 1. It is evident from Table 4 that as the concentration of Aloe vera in the drilling fluid increases, the rheology is modified. The rheological parameters including plastic viscosity, apparent viscosity, yield point and gel strength of the mud at different concentrations of Aloe vera (1.0 ppb, 2.0 ppb, 3.0 ppb and 4.0 ppb) is compared to that of the prepared bentonite mud (simple water-based drilling fluid). The rheological properties display a significant increase in the viscosities and the yield point. The results on the dependence of apparent viscosity on shear rate follows that, as the concentration of Aloe vera increases, the apparent viscosity also increases. A similar trend is observed on the plastic viscosity. It is an established fact that if the plastic viscosity increases without a significant mud weight change, there is an increase in ultra-fine drill solid content in the mud system. Thus, PV is regarded as a guide to solids control. An increase in the plastic viscosity has several impacts on drilling operations: it increases the equivalent circulation density (ECD), surge and swab pressures are increased, the chance of differential sticking increases, rate of penetration (ROP) decreases as drilling with a high PV mud is slower. An observation of the yield point plot indicates that the yield point increases as the concentration of Aloe vera is increased in the mud system. A non-zero yield point causes a sudden pressure change when fluid starts to move or is about to stop moving. It also causes a sudden borehole pressure (BHP) change when the drill string starts to move up/down during drilling or tripping, regardless of how slow the pipe moves. Low yield point fluids help to reduce the pressure change.

TABLE 5

Filtration characteristics of Aloe vera muds

| | | ml of Filtrate collected | | | |
|---|---|---|---|---|---|
| t, min | 0 ppb | 1.0 ppb | 2.0 ppb | 3.0 ppb | 4.0 ppb |
| 30 | 15 | 10.6 | 10.4 | 9.7 | 9.4 |
| % Reduction in Water Loss | | 29.33 | 30.67 | 35.33 | 37.33 |

Table 5 shows the filtration characteristics of the mud with increasing Aloe vera concentration. It is observed that as the concentration is increased, the filtration properties of the mud are improved and the maximum percentage water reduction achieved is 37.33% at 4.0 ppb concentration. Therefore, Aloe vera provides excellent control of filtration by controlling filter loss.

Thus, Aloe vera as a drilling fluid additive may function as a 1) rheological modifier and/or a 2) filtration control agent.

The invention claimed is:

1. A process for fracturing an underground geological formation, comprising:
    mixing water, Aloe vera powder having a largest dimension of 75-600 µm, and bentonite to form a drilling mud composition,
    wherein the Aloe vera particles are present in the drilling mud composition at a concentration of less than 150 ppm, relative to the total weight of the drilling mud composition; and
    wherein the Aloe vera particles comprise 20-60 wt % carbon, 30-36 wt % oxygen, 2-14 wt % calcium, 1-9 wt % potassium, 1-8 wt % chlorine, 1-5 wt % aluminum, and 1-4 wt % phosphorous, relative to the total weight of the Aloe vera particles;
    injecting the drilling mud composition into the underground geological formation through a well bore at a pressure of at least 5,000 psi to fracture the underground geological formation and form fissures in the underground geological formation, then
    injecting a suspension of sand or quartz into the underground geological formation through the well bore to deposit the sand or the quartz in the fissures.

2. The process of claim 1, wherein the bentonite is present in an amount of 0.1-30 wt % relative to the total weight of the drilling mud composition.

3. The process of claim 1, wherein the drilling mud composition has an apparent viscosity of 11-15 cP.

4. The process of claim 1, wherein the drilling mud composition has a plastic viscosity of 7.5-10.5 cP.

5. The process of claim 1, wherein the drilling mud composition has a yield point of 5-12 lb/100 f.

6. The process of claim 1, wherein the drilling mud composition has a gel strength of 3-15 lb/100 ft$^2$ after 10 seconds.

7. The process of claim 1, wherein the drilling mud composition reduces a % loss of the aqueous base fluid in the underground geological formation during the injecting compared to a drilling mud composition that is substantially the same without the Aloe vera particles.

8. The process of claim 1, further comprising circulating the drilling mud composition within the well bore after the injecting.

9. The process of claim 8, wherein the drilling mud composition is circulated for at least 30 minutes.

10. The process of claim 1, wherein the drilling mud composition further comprises at least one additive selected from the group consisting of an antiscalant, a thickener, a deflocculant, an anionic polyelectrolyte, a lubricant, a fluid loss additive, and a weighting agent.

* * * * *